Figure 1:
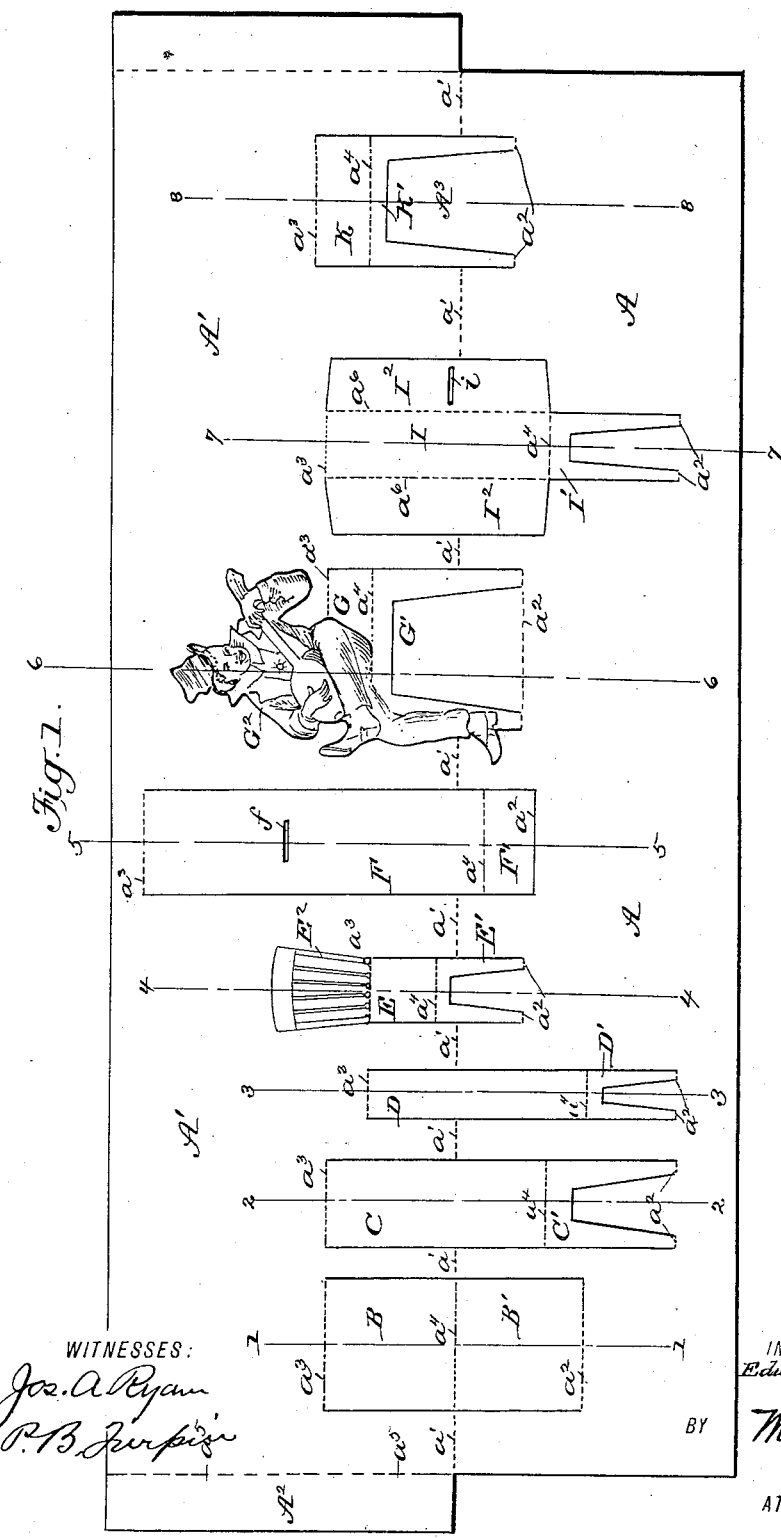

(No Model.) 4 Sheets—Sheet 1.

E. T. GIBSON.
TOY.

No. 565,450. Patented Aug. 11, 1896.

WITNESSES:
Jos. A. Ryan
P. B. Turpin

INVENTOR
Edward T. Gibson
BY
Munn & Co
ATTORNEYS.

(No Model.) 4 Sheets—Sheet 2.
E. T. GIBSON.
TOY.

No. 565,450. Patented Aug. 11, 1896.

WITNESSES:
Jos. A. Ryan
P. B. Turpin.

INVENTOR
Edward T. Gibson.
BY Munn & Co
ATTORNEYS.

(No Model.) 4 Sheets—Sheet 3.
E. T. GIBSON.
TOY.
No. 565,450. Patented Aug. 11, 1896.
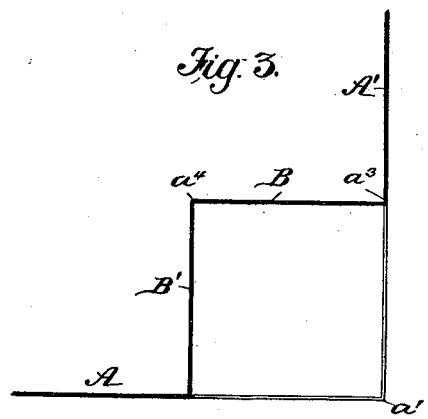
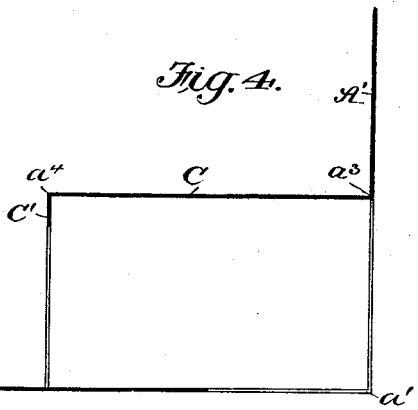
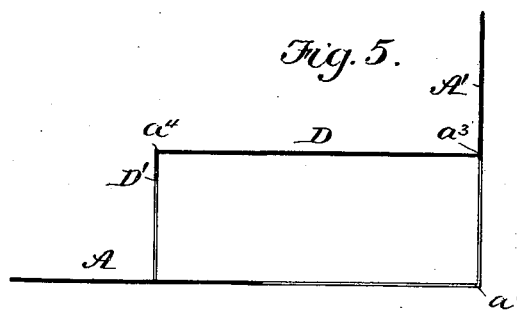
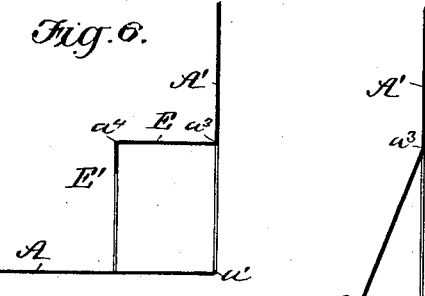
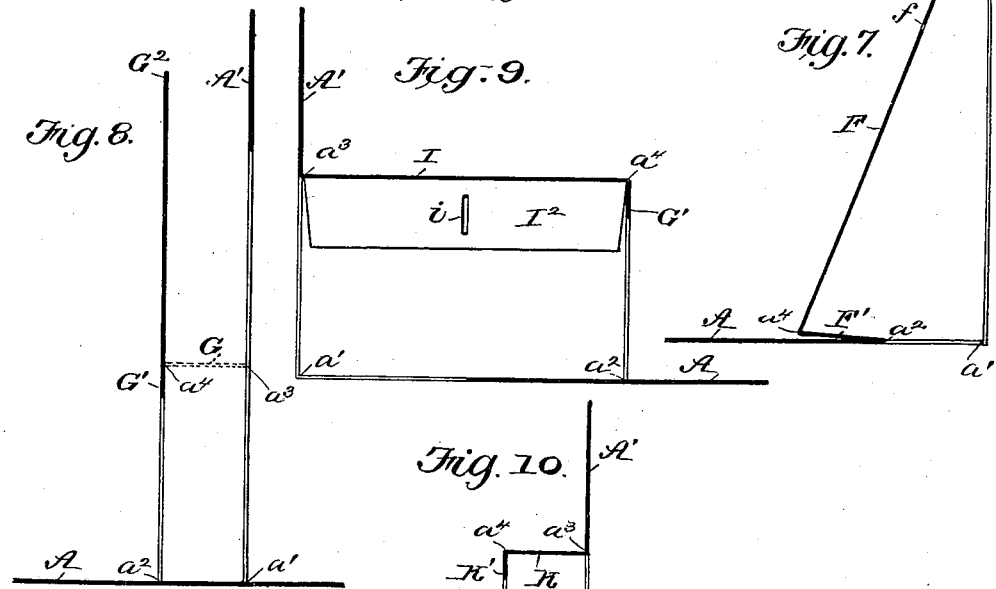
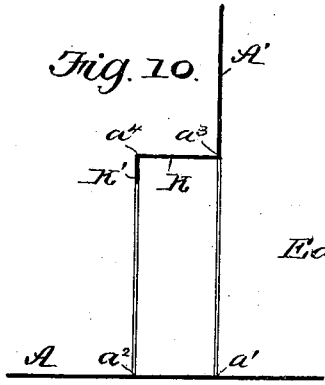
WITNESSES:
Jos. A. Ryan
P. B. Turpin.
INVENTOR
Edward T. Gibson
BY Munn & Co
ATTORNEYS.

(No Model.) 4 Sheets—Sheet 4.
E. T. GIBSON.
TOY.

No. 565,450. Patented Aug. 11, 1896.

WITNESSES:
Jos. A. Ryan
P. B. Turpin

INVENTOR
Edward T. Gibson
BY Munn & Co
ATTORNEYS.

UNITED STATES PATENT OFFICE.

EDWARD TINKHAM GIBSON, OF MINNEAPOLIS, MINNESOTA.

TOY.

SPECIFICATION forming part of Letters Patent No. 565,450, dated August 11, 1896.

Application filed January 11, 1896. Serial No. 575,148. (No model.)

*To all whom it may concern:*

Be it known that I, EDWARD TINKHAM GIBSON, a citizen of the United States, residing in Minneapolis, in the county of Hennepin and State of Minnesota, have invented certain new and useful Improvements in Advertising Articles, of which the following is a specification.

This invention has reference to an improved advertising article in the nature of a toy which it so be printed on the lithographic press, cut by dies in certain parts, provided with a number of creased or "scored" lines for bending, and shipped in flat shape to the party who desires to employ the article. When required for use, the card is bent upon itself to a right angle, thereby causing certain portions of the lithographed picture which by the aforesaid die cuts have been freed along their side margins from the arms of the said right angle, and which are wholly or partially attached by their top and bottom extremities to the arms of the said right angle, and which at the junction of the said extremities with the arms of the said angle are suitably creased or scored, to spring away from the site of their original attachment to the card before the die cuts were made, and occupy a position anterior to the apex of and within the said right angle.

I am aware of the existence of picture-cards having cut-out portions which are brought out in relief against the background by partially folding the card on creased or scored lines; but in my invention this is accomplished in an entirely different manner, as will be seen from the following specification and accompanying drawings, and admits not only of cut-out portions being brought out in relief against the background, but also admits of the quite natural representation of certain objects in relief, (as a table, a chair, a box, a desk,) which by none other of the inventions with which I am acquainted could be thus represented.

My invention consists of the novel features of construction whereby I accomplish what is above set forth, as will be fully described hereinafter; and the characteristic feature of my invention lies in having the pictorially-represented object which is desired to have brought out in relief anterior to the apex of the angle formed by bending the card upon itself to a right angle, attached either wholly or in part at its extremities to both arms of the said right angle, but entirely free along its other margins.

Figure 2:
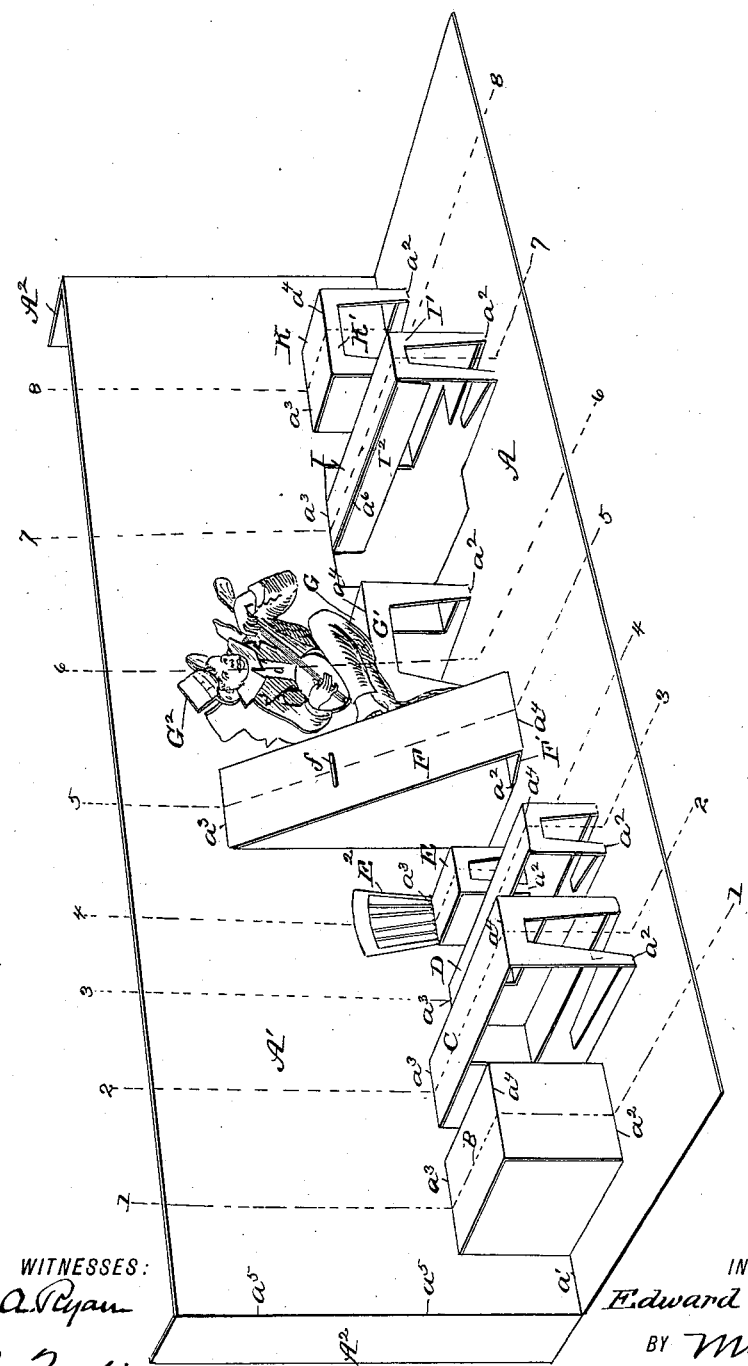
Figure 11:
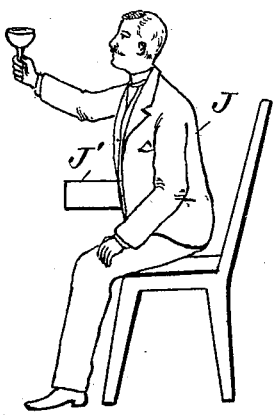
Figure 12:
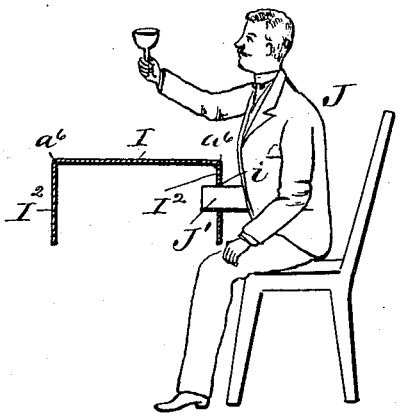
Figure 13:
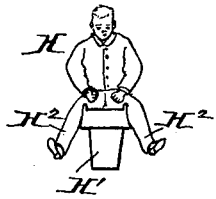
Figure 14:
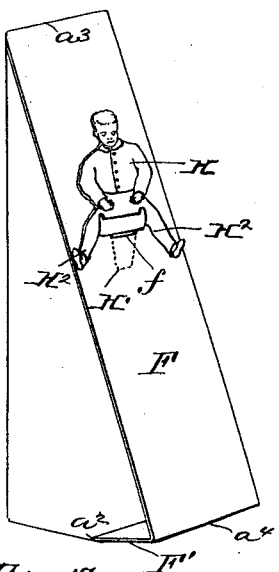
Figure 15:
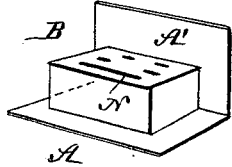
Figure 16:
Figure 17:
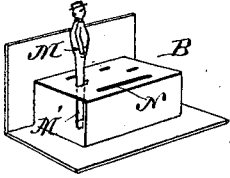

In the accompanying drawings, Figure 1 is a blank of my improved advertising article, showing as objects the pictorial representation of the top and anterior side of a square box at line 1, the top and anterior legs of a table at line 2, the seat and anterior legs of a bench at line 3, the back, seat, and anterior legs of a chair at line 4, an incline plane at line 5, the figure of a minstrel, the top of a box, and anterior side of a box at line 6, the top, side leaves, and anterior legs of a table at line 7, and the top and anterior legs of a narrow table at line 8. Fig. 2 is a perspective view of the same when the blank is bent upon itself along the creased or scored line $a'$ to a right angle. Fig. 3 is a vertical transverse section of the same on the line 1, (through the square box.) Fig. 4 is a similar section on the line 2, (table.) Fig. 5 is a similar view on the line 3, (bench.) Fig. 6 is a similar view on the line 4, (chair.) Fig. 7 is a similar view on the line 5, (inclined plane.) Fig. 8 is a similar view on the line 6, (minstrel seated on box.) Fig. 9 is a similar view on the line 7, (table with drooping leaves.) Fig. 10 is a similar view on line 8, (narrow-top table.) Fig. 11 represents a printed object, (the figure of a man seated in a chair in the drawings), from the outlines of which all superfluous paper has been cut away, and which object is used in combination with one of the drooping table-leaves or an equivalent, shown at 7 in Figs. 1 and 2. Fig. 12 is a vertical transverse section of the table with drooping leaves, and shows Fig. 11 detachably secured in position to one of the drooping table-leaves. Fig. 13 represents a printed object, (the figure of a boy on a sled is shown in drawings,) from the outlines of which all superfluous paper has been cut away and which object is used in combination with the said inclined plane F or background A'. Fig. 14 is a perspective view of Fig. 13 in said combination. Fig. 15 is a perspective view showing the box stage. Fig. 16 is a detail view of a printed figure or object to be used in connection with such stage, and Fig. 17 is a perspective view showing the figure and stage as in use.

With the exception of the printed objects shown by Figs. 11 and 13, my improved advertising article is made of one continuous blank of suitable card paper and is divided by a crease or scored line $a'$, so as to form two main parts, namely: A base A and a background $A'$, which background occupies a position at right angles to the said base when the advertising article is brought into use by bending the card paper on the said crease $a'$.

If it is desired that the advertising novelty when in use shall set out in relief the topmost side and anterior side of a square box, or an equivalent, as shown at line 1 in Figs. 1 and 2, and in Fig. 3, the said topmost side B is pictorially represented on the background $A'$, beginning at the creased or scored line $a'$ and extending to the proper distance upward, while the anterior side $B'$ is pictorially represented on the base A, beginning at the same portion of the creased line $a'$ and extending downward to the same distance that the topmost side B extends above the said creased line $a'$. The margins of the pictorial representation which extend at right angles to the said creased line $a'$ are then freed from their attachment to the card-paper blank by drawing the point of a knife-blade along them or by a cutting-die, but the end margins of the two said pictorially-represented sides, which end margins are parallel with the said creased line $a'$, are not freed from their attachment, but instead are provided at their junction with the said base A and background $A'$ with a creased, grooved, or scored line $a^2$ and $a^3$, the groove of the said scored lines ($a^2$ and $a^3$) being on the same surface of the card-paper blank as the groove of the scored line $a'$, and at the junction of the said topmost side B with the anterior side $B'$ another creased or scored line $a^4$ is provided, but its groove is on the opposite surface of the card-paper blank to that of the scored lines $a'$, $a^2$ and $a^3$; hence it follows that when the base A and background $A'$ are arranged at right angles to each other by bending the card-paper blank on the scored line $a'$ the topmost side B of the box representation is bent to form a right angle with the surface of the background $A'$, while the anterior side $B'$ is bent to form a right angle with the base A.

Having thus described my invention as applied to produce, within the angle formed by bending the card-paper blank upon itself to a right angle, a representation in relief of the topmost side and anterior side of a square box or an equivalent, it can be readily seen that if the object which is desired to have thus represented is one (as a table, for instance) having a topmost side C of greater extent than that of the anterior side $C'$, or leg portion, measured on a line at right angles to the said scored line $a'$, the pictorial representation of the said table-top C must only extend on the background $A'$ of the card-paper blank to a distance above the scored line $a'$, which is equal to the height which is intended the top of the table shall occupy above the base A when the card-paper blank is bent to a right angle upon the scored line $a'$. In other words, the pictorial representation of the table-top, or an equivalent, extends on the flattened lithographed blank both below and above the scored line $a'$, but to only such distance above the said scored line $a'$ as equals the vertical measurement of the leg portion $C'$.

From the description just given of the construction of a table the construction of the bench representation D or an equivalent will be understood, as will also the construction of the chair E or an equivalent when I add that in the case of the chair the chair-back $E^2$ is simply pictorially represented on the background $A'$.

At line 6 in Figs. 1 and 2, and in vertical transverse section in Fig. 8, I show a pictorially-represented object, which occupies on the flattened card-paper blank a position extending from a point above the scored line $a'$ to a point below the said scored line. This pictorial representation has, as was set forth when describing the construction of the objects hereinbefore alluded to, the entire extent of its lateral margins freed from its connection with the card paper by a knife-cut, and, as was also set forth when describing the said objects hereinbefore alluded to, is not freed at its top and bottom extremities from its connection with the card-plate, but is provided with a scored line $a^2$ and $a^3$, having, as was also previously set forth, the groove of the said scored lines $a^2$ and $a^3$ on the same surface of the card-paper blank as the groove in the scored line $a'$ and also parallel with it; but, while the pictorial representation of the objects hereinbefore alluded to were wholly attached to the card-paper blank at the upper and lower extremities, in the case of the pictorial representation which we are now considering the upper and lower extremities are only partially attached to the card-paper blank. The reason for this partial attachment will now be made apparent. The pictorially-represented object now under consideration consists in the drawings of a negro minstrel $G^2$, arranged to appear, when the card-paper blank is bent upon the scored line $a'$ to a right angle, as though he was seated on the anterior and upper edge of a box G or an equivalent. Now, this representation demands that when the card-paper blank is thus bent to form a right angle the surface of the figure of the minstrel $G^2$ and the anterior side $G^7$ of the box must be on the same plane and stand at right angles to the base A, and to accomplish this none of the scored lines are allowed to cross the figure of the minstrel. I have already stated that, as in the case of the other pictorially-represented objects previously alluded to, the lateral margins of the minstrel and the box are freed from the card-paper blank by a knife-cut, consequently, in order to admit of the entire figure of the minstrel occupying a position at right angles to the base A, it is necessary that the knife-blade be carried along the margins of all that portion of the minstrel's figure which projects above the scored line $a^4$; and therefore I state in this specification that while the characteristic feature of my invention lies in having the pictorially-represented object printed upon the card-paper plate so as to extend across (but not crossed by) a scored line $a'$, and only attached to the substance of the card-paper blank by its upper extremity to the background A', and by its lower extremity to the base A, yet this attachment does not in all cases involve the entire extent of the margins of the said upper and lower extremities.

The construction of the inclined plane F, exhibited at line 5, Figs. 1 and 2, and in vertical transverse section in Fig. 7, need not be explained as it will be now understood, only that I must add that the scored line $a^4$ is placed at a point between the upper and lower extremity of the pictorial representation which is designed to be exhibited on an inclined surface when the card-paper blank is bent on the scored line $a'$, so that the background A' stands at right angles to the base A, which point of location of the said scored line $a^4$ is very near that of the scored line $a^2$. This inclined plane is a very important part of my invention, and one upon which I desire to lay considerable stress, for the following reasons, namely: A heavy card-paper blank, when properly scored by machinery, will not maintain its position when bent on the said scored lines, but will collapse as soon as no longer supported by the hand, and in my inclined plane F, I have invented a means whereby the collapsing forward of the background A' upon the base A is prevented, and the collapsing backward of the background can be prevented in one of the following three ways, to wit: by causing the surface F' to adhere to the base A by means of mucilage, or by a lip of paper formed in the base A and constructed to lap over the upper surface of F' when the article is in use, or by having a vertically-extended wing at one or both sides of the card-paper blank, as is shown at $A^2$ in Figs. 1 and 2, which wing or wings can be bent on the scored line $a^5$ to extend at right angles with the rear surface of the background A' when the card-paper blank is bent on the scored line $a'$. The face surface of the said inclined plane will be decorated to suit the object for which the improved advertising article is employed; for instance, a calendar of the year can be printed upon it, or it can be used to represent a toboggan slide, and by making an incision $f$ in it and inserting into the said incision the extension H' of the figure H, Fig. 13, which I have invented for this purpose, the appearance of a boy sliding down the inclined plane on a sled will be presented. In fact, many different object designs provided with an extention H', as shown in Fig. 13, will be employed by me for the purpose of decorating the face surface of the said inclined plane F and also the face surface of the background A' when the design and the customer's fancy will admit of it. My invention in this last said part of my improved advertising article is embodied in the figure of the boy on a sled, which I have selected for the purpose of illustration, and shown in the drawings in Fig. 13. This view shows the figure as printed with all the surplus paper cut away up to the outline of the figure, and in said view, Fig. 13, H represents the portion of paper on which is printed the bulk of the pictorially-represented figure or object; $H^2$, an extension upon which a small portion of the figure is printed for the purpose of accomplishing an object which will soon be explained; and H', an extension which admits of the pictorially-represented object being detachably connected to the said inclined plane F or background A' by inserting the extension H' into a slit in the inclined plane or background, which slit is shown at $f$ in the inclined plane.

I will now explain why I provide the extension $H^2$ in addition to the extension H'— i. e., if the extension $H^2$ did not exist, the figure or object would topple forward and out of position when the extension H' was inserted in the slit $f$, but by having the extension $H^2$, which is formed to overlap the paper which intervenes between it and extension H' when attached in position, the figure or object cannot topple forward.

In some of my improved advertising articles I shall provide a table I, or an equivalent, with drooping leaves I', or an equivalent, which drooping leaves are provided with a scored line $a^6$ at their junction with the table-top. I show this arrangement at line 7, Fig. 1, and in Fig. 9. And in order to still further improve my advertising article, I have invented a construction for a cut-out paper figure to be used in connection with it. In Fig. 11 in the drawings I show the figure J represented as a man seated in a chair and all the surplus paper cut away. The figure is provided with an extension J', which admits of its being detachably connected to one of the said drooping table-leaves I' and at right angles to the surface of the table-top by inserting the extension J' in a slit $i$, made in one of the table-leaves at right angles to the surface of the table-top when the article is in use. This combination is shown in Fig. 12.

In regard to the means which I have invented for the purpose of causing the background A' to maintain its position at right angles to the base A when the advertising article is in use, I have already stated that the said means consist of the inclined plane F and side wings $A^2$. I have also stated that in some cases the surface F' of the inclined plane would be caused to adhere to the base A by an application of mucilage or by a lip of paper from the base A being constructed to lap over the portion F'. When the said surface F' is thus fastened to the base A, the side wings A² may be dispensed with; but as the removal of the said side wings would leave the erected advertising article liable to be easily upset backward, I provide a construction exhibited at line 8 in Fig. 1, and shown in vertical transverse section (when the article is in use) in Fig. 10. The object shown in the said figures represents the top K of a narrow table, or an equivalent, and the anterior leg portion K'. It is provided with creased or scored lines $a^2$ $a^3$ $a^4$ and cut lateral margins, as has already hereinbefore been explained; but in order that this table may furnish the means whereby the tendency of the advertising article to be easily upset backward may be overcome, I have the largest portion of the said anterior leg portion K' pictorially represented on the background A', and by having the knife cut free the paper portion A³ from its connection to the portion K' an extension of the base A is provided. Hence it follows that when the background A' is erected at right angles to the base A by being bent on the scored line $a'$, the base extension A³ occupies a position at right angles to the rear surface of the background.

Before closing I desire to say that while I have stated in the foregoing specification that my improved advertising article is provided with creased or scored lines, it is evident that for the sake of economy I will in many of the articles which I shall prepare for the trade merely indicate the creased or scored lines by dotted lines, and in many instances may possibly not make the necessary cuts in the cardpaper blank myself, but indicate to the individual when the cuts are to be made and direct him to do it with the point of a knife-blade.

I also provide a miniature theater in which the elevated stage-platform will be produced and supported as is the topmost side B of the box, line 11, Figs. 1, 2, and 3, before described, and for the stage of this theater I provide cutout paper figures M, Fig. 16, having a downwardly-projected extension M'. A number of slits $n$ is formed in the stage-platform, and into one of such slits the extension M' is inserted, as shown in Fig. 17. I also provide a long slit N, to permit the operator to cause a figure M to appear "to act" by moving it along the surface of the platform by seizing that portion of the extension M' which projects below the stage-platform.

The slit N, it will be seen, is considerably longer than the extension M', so the latter may be given a substantial movement in the slit.

Having thus described my invention, what I claim as new, and desire to secure by Letters Patent, is—

1. An article substantially as described comprising a card or plane, having a line upon which it may be bent to bring its arms at right angles to each other and having an object united at its ends to said card or plane on opposite sides of its angle and creased or bent between its ends reversely to the angle of the plane or card forming wings or sections one of said sections being extended beyond the angle between said wings or sections to produce a desired figure or representation substantially as set forth.

2. An article substantially as described comprising a card or blank having an angle or bend and provided with a portion extended past said angle united above and below the same and having between its ends an angle or bend reverse to that of the card or plane and forming upper and lower wings or sections the lower section being extended above its angle with the other section and formed to present a figure or representation all substantially as and for the purposes set forth.

3. In an article substantially as described the card or plane provided with a relief portion and bent or creased between the ends of said portion the latter being provided with a portion lapped against the lower arm of the card or plane substantially as set forth.

4. The toy article herein described consisting of a flexible cardboard having a longitudinal bending-line upon which it is bent to bring its arms above and below the same to an angle with each other and having slits extending transversely across said bend to a point above and below the same forming a separate object adapted to be brought out in relief anterior to the apex of the angle formed by bending the card or plane, such object having between its ends a bending-line upon which it is bent reversely to the bend in the card or plane, substantially as shown and described.

5. The combination with the card or plane and the table figure bent in relief therefrom and having a side leaf provided with a slot of the figure having a tongue fitted in said slot substantially as set forth.

6. The article herein described composed of a card or plane having a bending-line and a cut-out portion united at its ends to the plane above and below said bending-line and having a portion of the card between the side edges of said cut-out portion separated and projected in an unfolded extension past the bending-line of the card and adapted to remain in the same plane with the base arms of the card when the latter is bent substantially as set forth.

7. The combination with the card or plane and the box figure or stage bent in relief therefrom and having its topmost side or platform provided with slits, of detachable figures having downwardly-projected extensions to enter said slits substantially as described.

EDWARD TINKHAM GIBSON.

Witnesses:
MAUD C. GIBSON,
MYRON E. CURTISS.